United States Patent [19]

Langen

[11] Patent Number: 5,136,862
[45] Date of Patent: Aug. 11, 1992

[54] COMPUTER FLOPPY DISC LOCK

[76] Inventor: Richard Langen, 5720 Macleod Trail South, Calgary, Alberta, Canada, T2H 0J6

[21] Appl. No.: 789,853

[22] Filed: Nov. 8, 1991

[51] Int. Cl.⁵ .............................................. E05B 73/00
[52] U.S. Cl. .............................................. 70/14; 70/58
[58] Field of Search ................. 70/14, 57, 58, 158-173

[56] References Cited

U.S. PATENT DOCUMENTS

| | | | |
|---|---|---|---|
| 4,640,106 | 2/1987 | Derman | 70/58 X |
| 4,655,057 | 4/1987 | Derman | 70/58 X |
| 4,685,312 | 8/1987 | Lakoski et al. | 70/58 X |
| 4,794,587 | 12/1988 | Cordiano | 70/58 X |
| 4,856,304 | 8/1989 | Derman | 70/58 X |
| 4,907,111 | 3/1990 | Derman | 70/14 X |
| 4,918,952 | 4/1990 | Lakoski et al. | 70/57 |
| 4,924,683 | 5/1990 | Derman | 70/58 X |
| 4,964,285 | 10/1990 | Lakoski et al. | 70/58 X |

Primary Examiner—Renee S. Luebke
Assistant Examiner—Suzanne L. Dino
Attorney, Agent, or Firm—George H. Dunsmuir

[57] ABSTRACT

Two versions of an improved device for preventing unauthorized access to computer, video, and audio and like disk and cassette drives are described. Drives with an existing external latch that prevents insertion or removal of the disk, such as standard 5¼ disk drives, are secured by means of an inserted plate which captures the latch in the closed position, combined with an external locking assembly which prevents movement of the inserted plate. Drives and players with an internal mechanism that moves the disk or cassette to a play position, for example 3½ disk drives, are secured by means of inserting a modified disk or cassette that has an attached plate that extends outside the drive when the disk or cassette is in playing position. A locking assembly with a plate to jamb the modified disk or cassette in position is locked to the extending position.

5 Claims, 6 Drawing Sheets

COMPUTER FLOPPY DISC LOCK

BACKGROUND OF THE INVENTION

The present invention primarily addresses the need for preventing unauthorized access to computer disk drives. A minor variation will be described for similar use with video cassette and some audio cassette data storage systems.

As has been itemized in several preceding patents, and eloquently in some (like Canadian Patent No. 1,283,204, Esakoff et al), there are many good reasons for ensuring that such access be limited. These include either software: such as secrets in a competitive business situation; private data of a personal or governmental nature; theft of software programs; inadvertent introduction of computer viruses; or hardware: such as possible damage of the drive by inexperienced users or curious children.

SUMAMRY OF THE INVENTION

The prior art includes several attempts to solve this problem, but existing solutions are deficient in various particulars. The closest to the present invention appears to be U.S. Pat. No. 4,907,111 (Derman) describing in one embodiment a device that includes hook-plates which fit under the floppy diskette jacket on a $5\frac{1}{4}''$ drive, inserting these may cause damage to the diskette. Also the device does not rest in the ouer rails of the drive disk slot, and may thus not provide good support. A second embodiment of Derman for $3\frac{1}{2}''$ drives utilizes a hook-plate which protrudes into the computer less than one half inch. This leaves very little area to support the bending movement on the plate caused by the weight of the outer works of the device, possibly causing damage to the drive and/or inserted disk. U.S. Pat. No. 4,794,587 (Cordiano) suffers from some of the same deficiencies. Other prior art, including U.S. Pat. Nos. 4,924,683 (Derman); 4,907,111 (Derman); Canadian #1,283,204 (Esakoff et al), utilized a hook or bracket and are substantially different from the present invention.

The present invention utilizes, in one embodiment for $5\frac{1}{4}''$ drives, the locking of the disk drive lever to prevent entry, and in a second, for $3\frac{1}{2}''$ drives, a jamb plate to prevent the usual vertical motion of the disk required to remove it. This second embodiment is also applicable to certain video and audio cassette storage systems. In both cases the invented floppy disk lock comprises:

1. A slide plate;
2. A lock assembly;
3. A key.

In the case of the $5\frac{1}{4}''$ version, the slide plate is a dummy half-disk inserted into the disk drive in place of the data disk. This unique design also has the advantage that when in place, the computer operates in a manner as if no disk were in place at all. Thus the computer can be "Booted" with the device in place. If a regular blank disk were in place, "Booting" could be halted in view of the way the computer operates. The slide plate engages the disk drive latch with the latch in the closed position. The lock assembly is then slid onto the slide plate, and the assembly fits against the front of the disk drive, locking firmly onto teeth on the slide plate. The device is thus locked in position.

It will be appreciated that the full width and adequate depth of the slide plate, and the interlocking of the metal of the lock assembly to the metal teeth of the slide plate, characteristically both of tempered steel, ensures that there is no access to the machine without its severe damage. These features also ensure smooth repeated use of the device without any minor damage which could be caused by point-stress to the inside of the drive, as is a danger with some of the prior art.

The second embodiment, for the $3\frac{1}{2}''$ version, differs only in that an actual diskette, modified to bear a protrusion with teeth identical to those on the slide plate is inserted instead of a slide plate alone, and a jamb plate is added to the lock assembly. Thus instead of capturing the lock lever in its engaged position as is done in the $1\frac{1}{4}''$ version, the modified diskette is captured in its engaged position. As in the first embodiment, removal is impossible without severe damage to the drive. This second embodiment is even more sturdy than the first, because the installed modified disk is in the normal operating position and seats on the entire alignment post system of the drive.

It will be appreciated that this second embodiment can appropriately be used as a locking mechanism for standard video and some audio cassette systems. All that is required is to adapt the size of the invented device to the physical measurements of the video or audio cassette player; the jamb plate will again prevent removal of attached cassette, and the unit will be unusable until unlocked.

One object of the present invention is to provide an improved device for preventing unauthorized access to computer disk drives that have an external latch that has an open and a closed position, when this closed position has been designed to prevent entry or exit of standard disks appropriate to the drive.

This device is comprised of:

a) a slide plate to be inserted into the drive when the latch is in the open position; the slide plate being designed so that when the latch is in the closed position the slide plate is prevented from complete removal from the drive in substantially the same way as a standard disk appropriate to the drive is prevented;

b) flanges on the edge of the slide plate opposite to the edge that is inserted into the drive, the spaces between flanges being designed to allow the latch to move into the closed position when the slide plate is at its maximum insertion, and being also designed so that when the slide plate is thereafter moved out of the drive an appropriate amount, certain flanges block the movement of the latch such that it cannot return to the open position; and c) a means of locking the slide plate into said position, in which flanges block the movement of the latch.

A further object of the invention is to provide such a device in which this means of locking is comprises of:

a) a locking assembly placed over one or more of the flanges extending from the slide plate external to the drive when the slide plate is in the position blocking the movement of the latch; this locking assembly having a face abutting against the external face of the drive unit;

b) means of engaging the locking assembly with one or more flanges such that in the engaged position, the slide plate can no longer be moved into the drive because the locking assembly abuts against the drive face; such engaged position having the effect that the latch is held in the closed position and the slide plate cannot be removed; and c) means of locking and unlocking the engagement of the locking assembly with the slide plate.

It is a further object of the invention to provide an improved device for preventing unauthorized access to computer disk drives or audio or video cassette drives or the like that have an external mechanism that moves the inserted disk or cassette into a playing position, such device being comprised of:

a) a modified disk or cassette formed by adding a plate to one edge of a disk or cassette normally played on such a drive, such that the plate extends outside the drive after the disk or cassette has been inserted and moved by the internal drive mechanism to a standard playing position; and b) means of locking the extending plate in place after the internal drive has moved to said standard playing position, such that the plate and attached disk or cassette is prevented from movement.

A yet further object of the present invention is to provide an improved device for preventing unauthorized access to 5¼" computer disk drives that have an external latch that has an open and a closed position, when the closed position has been designed to prevent entry or exit of standard 5¼" disks; said device comprising;

a) a slide plate, of steel or similarly strong material, having dimensions as wide as an actual 5¼" disk and thickness and depth less than or equal to the thickness and depth of an actual 5¼" disk, so as to be capable of being inserted into the drive when the latch is in the open position;

b) parallel flanges extending from the edge of the slide plate opposite to that edge designed to be inserted into the drive, the exterior borders of the exterior two of which flanges comprise a portion of the exterior edges of the plate; and the magnitude of extension, and space between, the two flanges nearest the latch being sufficient to allow the latch to move into the closed position when the slide plate is at its maximum insertion, and being also designed so that when the slide plate is thereafter moved out of the drive an appropriate amount said two flanges block the movement of the latch such that it cannot return to the open position;

c) teeth, being serrated indentations, on one of the flanges not forming the enclosure around the latch;

d) a locking assembly formed to fit over at least one flange, which is the one with teeth; the locking assembly being formed of:

i) a main bracket, of durable metal or similar strong material, and containing: a turnable lock barrel engaging with a turnable cam; a screw to hold said lock barrel and cam in position; a slide latch capable of being moved by said cam; said slide latch fashioned to engage with the teeth on the flange when so moved; a spring that disengages the slide latch from the teeth when the lock barrel is turned and the cam moves away from the slide latch; a key to turn the lock barrel and hence cam.

To the inventor's knowledge there is no prior art that solves the problem of access to computer disk and audio/video cassette drives in a similar manner; therefore the invention may have applications outside the existing specific use to be described. For this reason the reader is advised that the contexts discussed in this introduction and the more detailed description to follow are by example only and in no way are intended to limit the scope of the appended claims.

BRIEF DESCRIPTION OF THE DRAWINGS

For this description, refer to the accompanying drawings in which.

DESCRIPTION OF THE PREFERRED EMBODIMENTS

Figure 1:
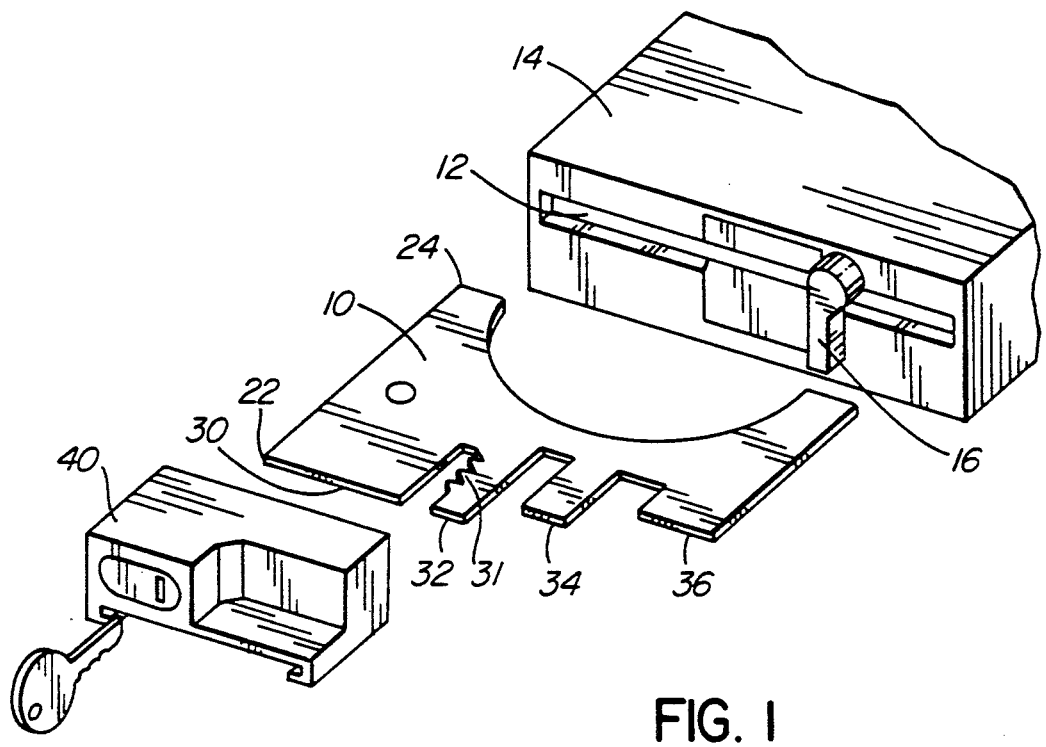
FIG. 1 is a perspective, exploded view of elements of one embodiment of the invention.

The embodiments of the invention will be described, one having applications of 5¼" computer disk drives or similar drives having an externally operated engagement latch, and the other for 3½" computer disk drives and also any computer, video, audio, or similar cassette drives having an internal automatic mechanism that moves the cassette to and from a playing position.

In the following description, like reference numerals will identify like parts.

Figure 2:
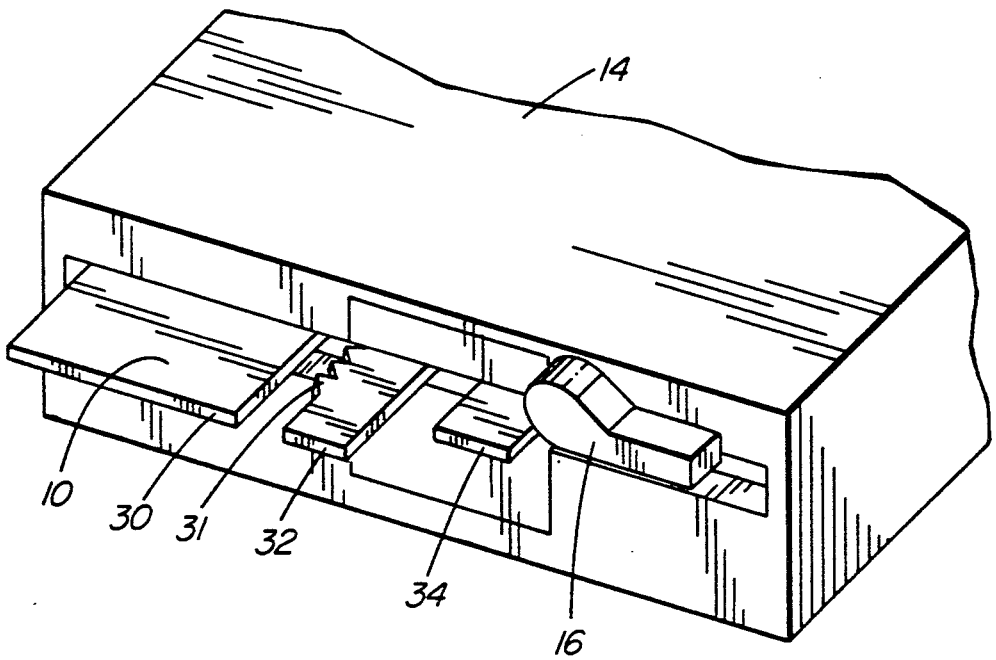
FIGS. 2, 3 and 4 are perspective views of the embodiment of FIG. 1 in three stages of installation.
Figure 3:
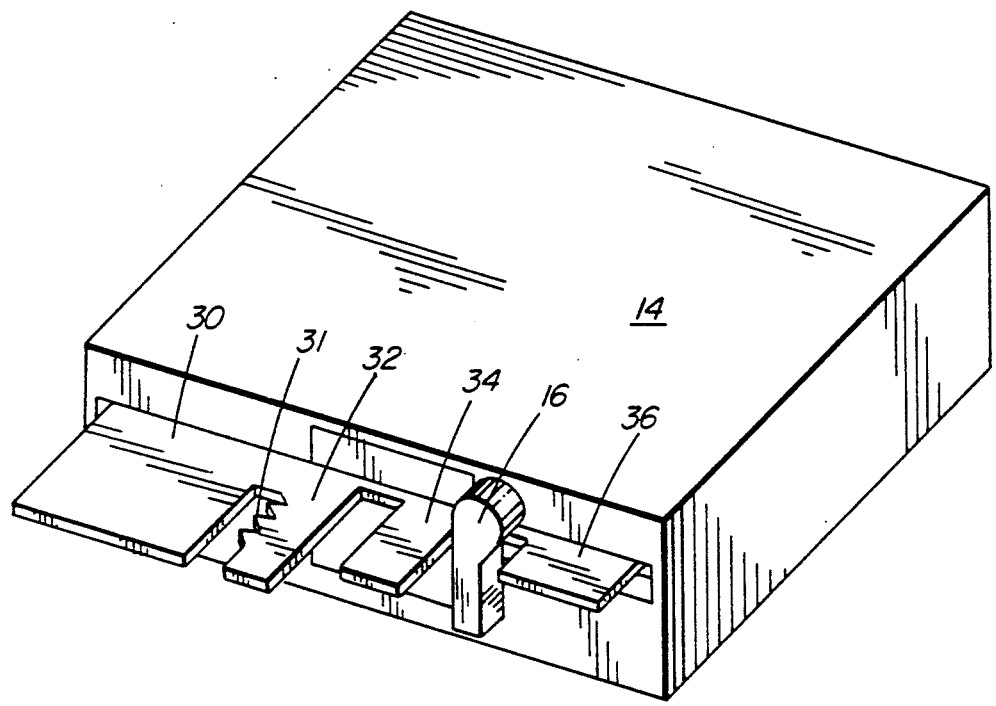
Figure 4:
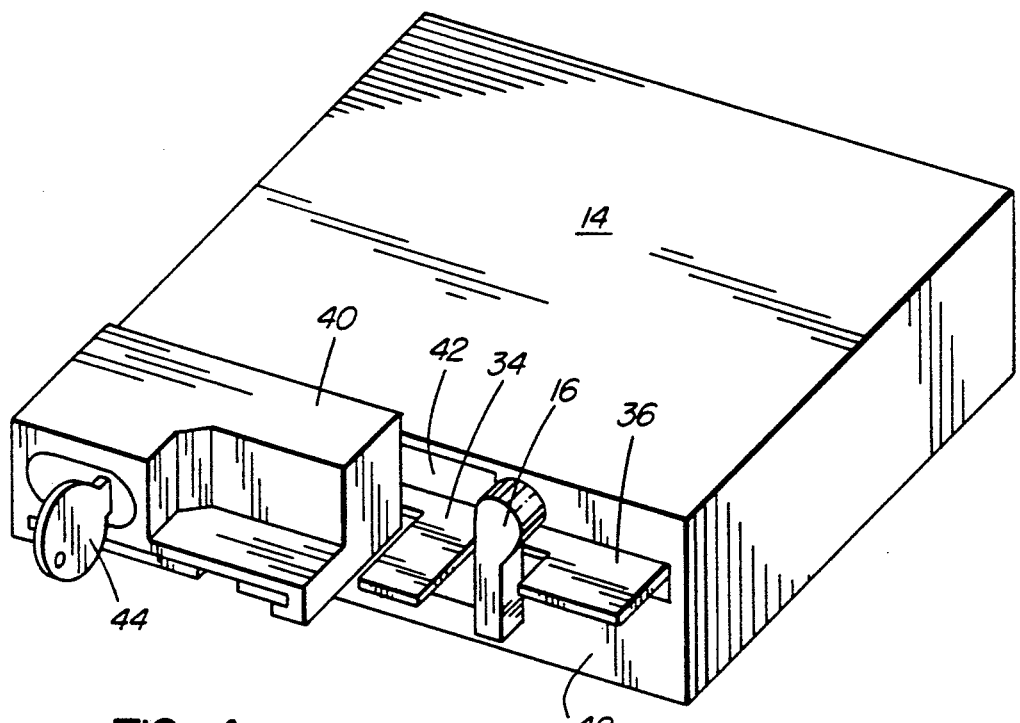
Figure 5:
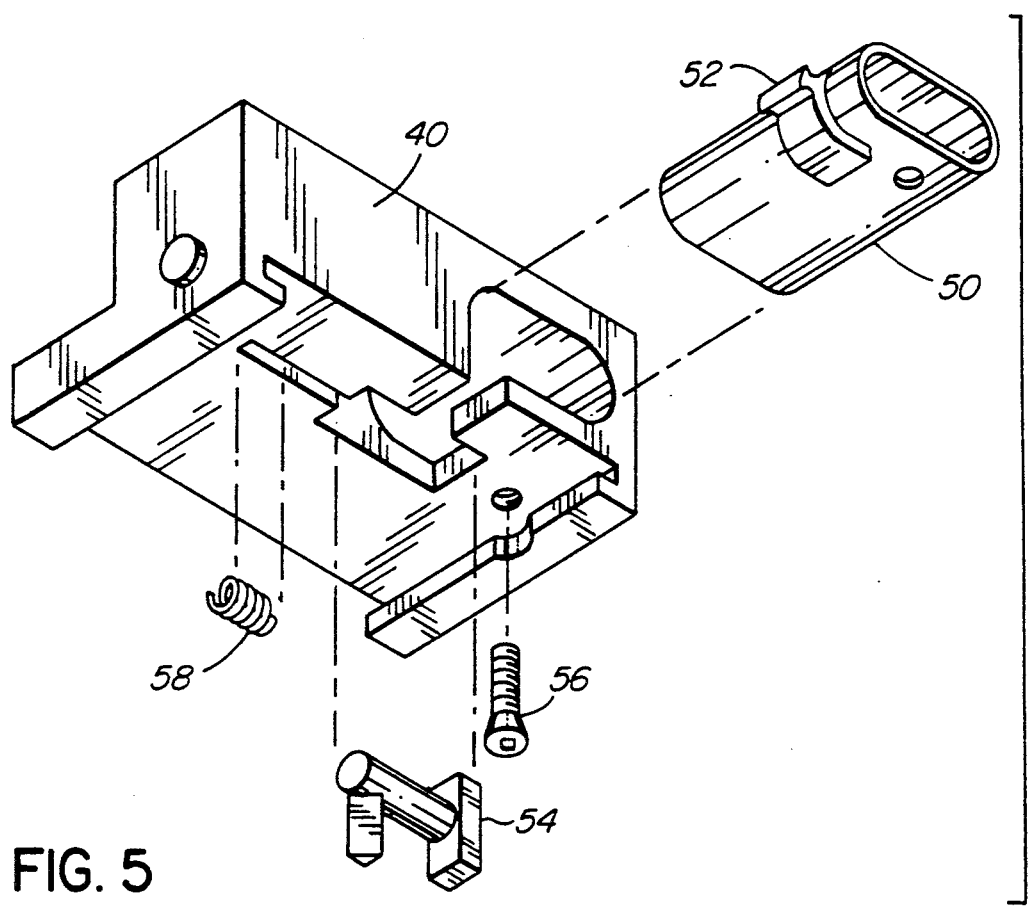
FIG. 5 is a perspective, exploded view of a lock assembly according to the invention.

First, for the latch type, and referring to FIG. 1, slide plate 10 is manufactured to appropriate width and thickness to be a dummy half-disk when inserted in opening 12 in disk drive unit 14. A latch 16 is provided on the front face of drive unit 14. The slide plate 10 is the same width as a genuine data disk, so as to fill almost the entire width of slot 12, and is as thick or less thick in comparison with such a data disk, so as to be acceptably inserted in slot 12 without damaging the internal disk mechanism. The plate 10 shall be a strong substance; preferably steel or equivalent strength. Greatest depth of the slide plate, found on the side farthest from the latch 16, being the distance between corners 22 and 24 of plate 10 shall be less than or equal to that of a genuine data disk, so that the slide plate can be inserted past latch 16 and then pulled back after 16 is in the closed position. The purpose and sizing of the oblong openings in the front edge of the slide plate 10 will be come clear as the locking process is described, as follows:

Referring to FIG. 2, the slide plate 10 is inserted to its maximum planned depth, with the latch handle 16 in the vertical or open position. Protruding flanges 30, 32 and 34 extend outside the drive opening. Now latch 16 is moved down clockwise into the locked position, as seen in FIG. 3. It will be appreciated that flange 36, as seen on FIG. 3, is short enough so that it is actually inside the drive at maximum insertion in FIG. 2, after the latch is put in the locked position the entire slide plate 10 is pulled out so that the latch 16 cannot be opened; it is prevented from movement by flange 36. Should the latch 16 have an internal mechanism that allows full rotation, it is likewise prevented from rotating by flange 34. In FIG. 4 the lock assembly 40 has been set in place over flange 30 and 32. Lock assembly 40 is manufactured so that it can be pushed flush up against the drive face 42. Key 44 is in in unlocked position. The key 44 is turned and removed, and the unit is locked in place.

Such locking procedure is shown in FIGS. 5, 6, 6A and 6B of the locking assembly. Lock barrel 50 turns the lock cam 52 which pushes slide latch 54. It can be seen in FIGS. 2 and 3 that flange 32 has several teeth 31 facing flange 30; slide latch 54 is designed to engage teeth 31. Key 44 is removed and the unit is secure. Screw 56 holds lock barrel 50 inside the assembly; lock bracket 40 securely houses the entire assembly. Finally, spring 56 will disengage the slide latch 54 from the teeth 31 whenever the cam 52 is moved back by means of the key 44 moving the lock barrel 50 to the open position. Then the slide plate 10 can be pushed in to the drive sufficiently to allow latch 16 to open; lock bracket 40 and slide plate 10 can be then removed, and the drive is again ready for use.

Figure 7:
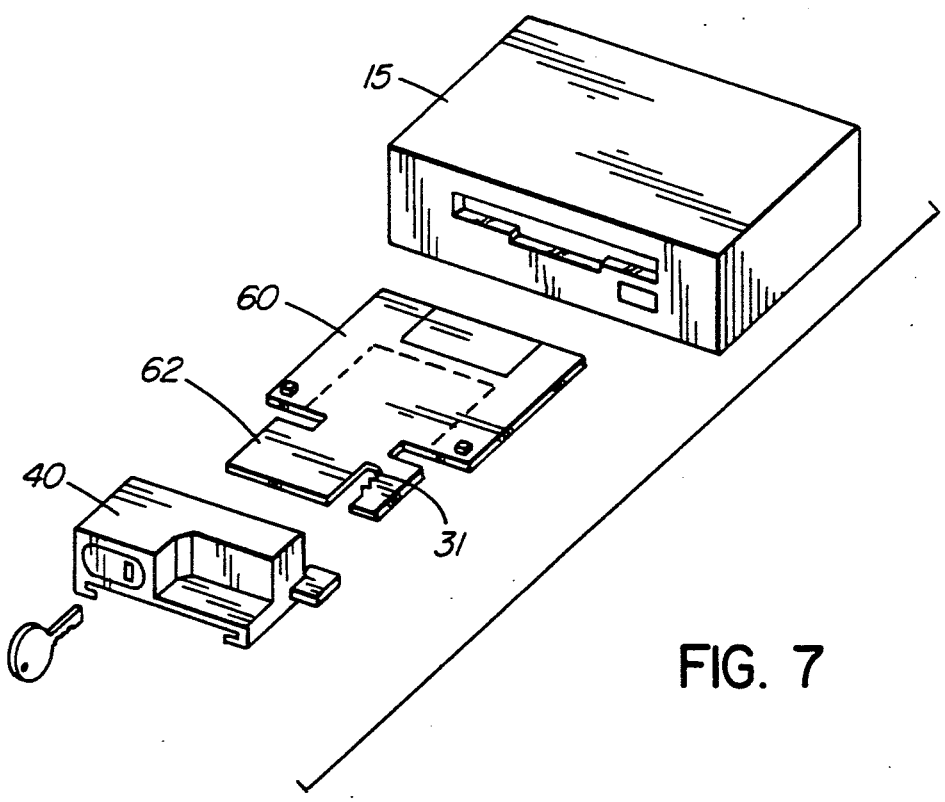
FIG. 7 is a perspective exploded view of a second embodiment of the invention, and appears on the sheet of drawings bearing FIG. 5.
Figure 6:
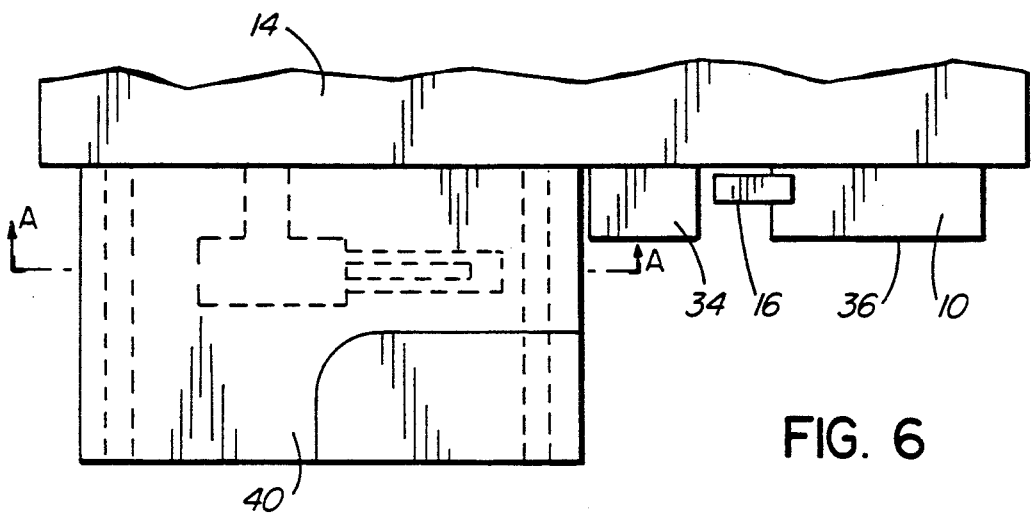
FIG. 6 is a top plan of a portion of an embodiment of the invention.
Figure 6A:
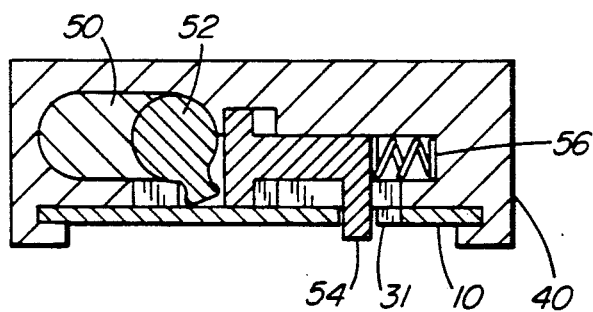
FIGS. 6A and 6B are sectional views taken along line A—A of FIG. 6, with the assembly in unlocked and locked position respectively.
Figure 6B:
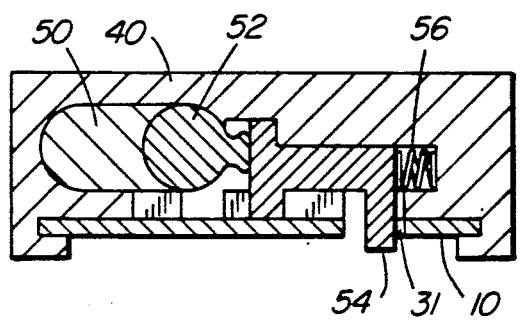
Figure 8:
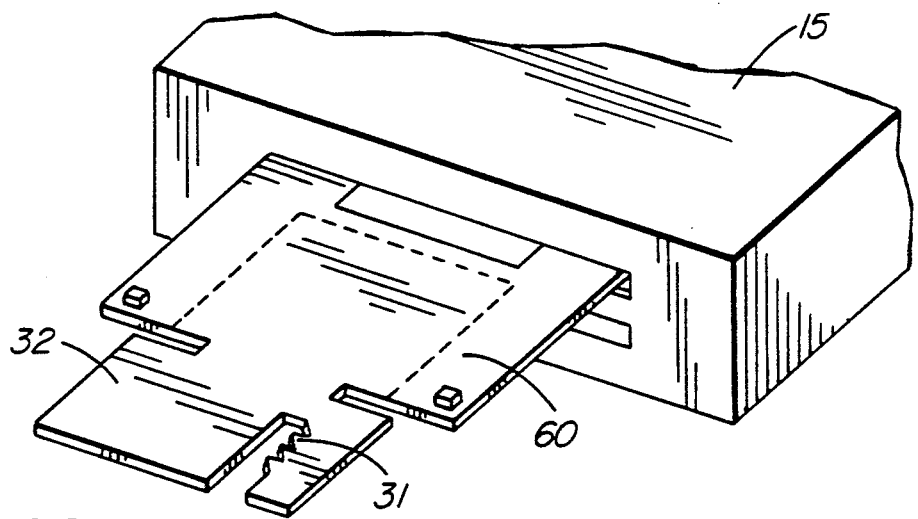
FIGS. 8, 9, 10, and 11 are perspective views of the assembly of FIG. 7, in successive stages of the locking process.
Figure 9:
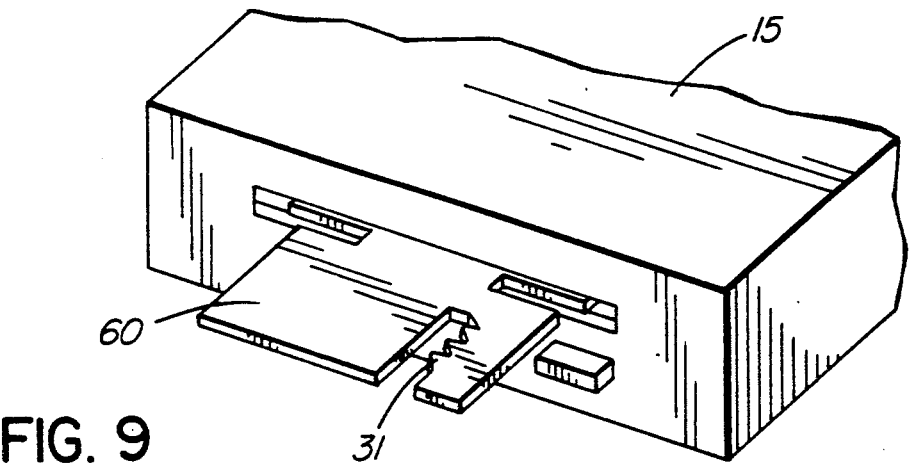
Figure 10:
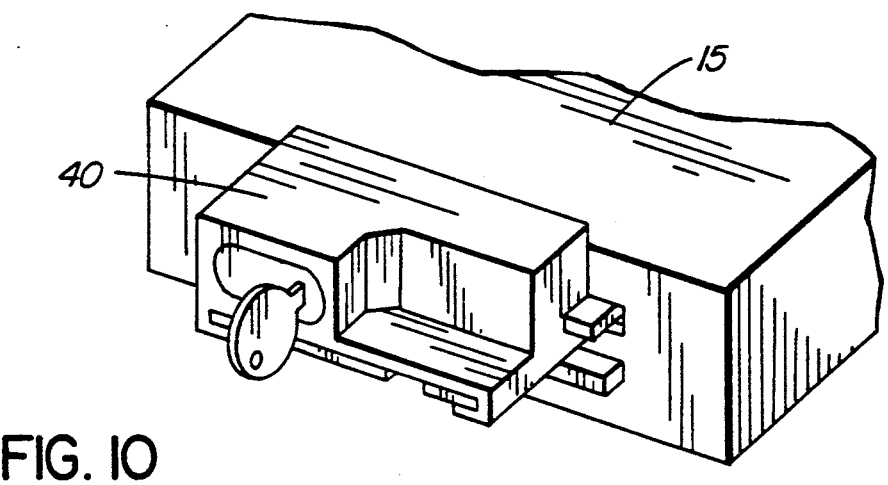
Figure 11:
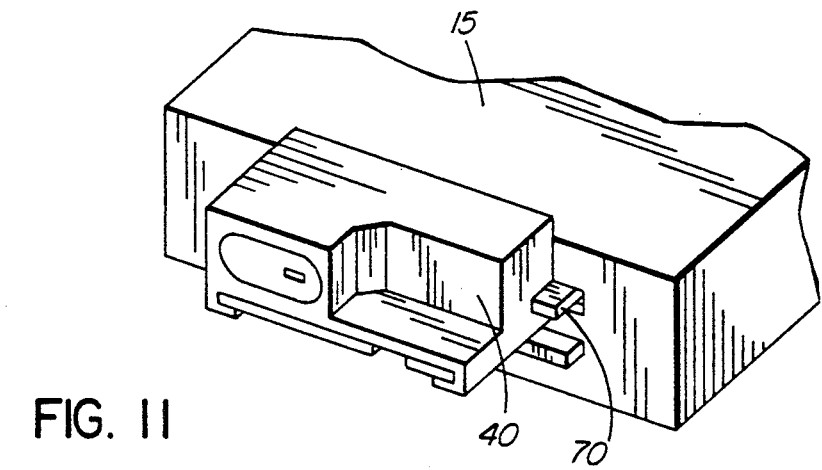
Figure 12:
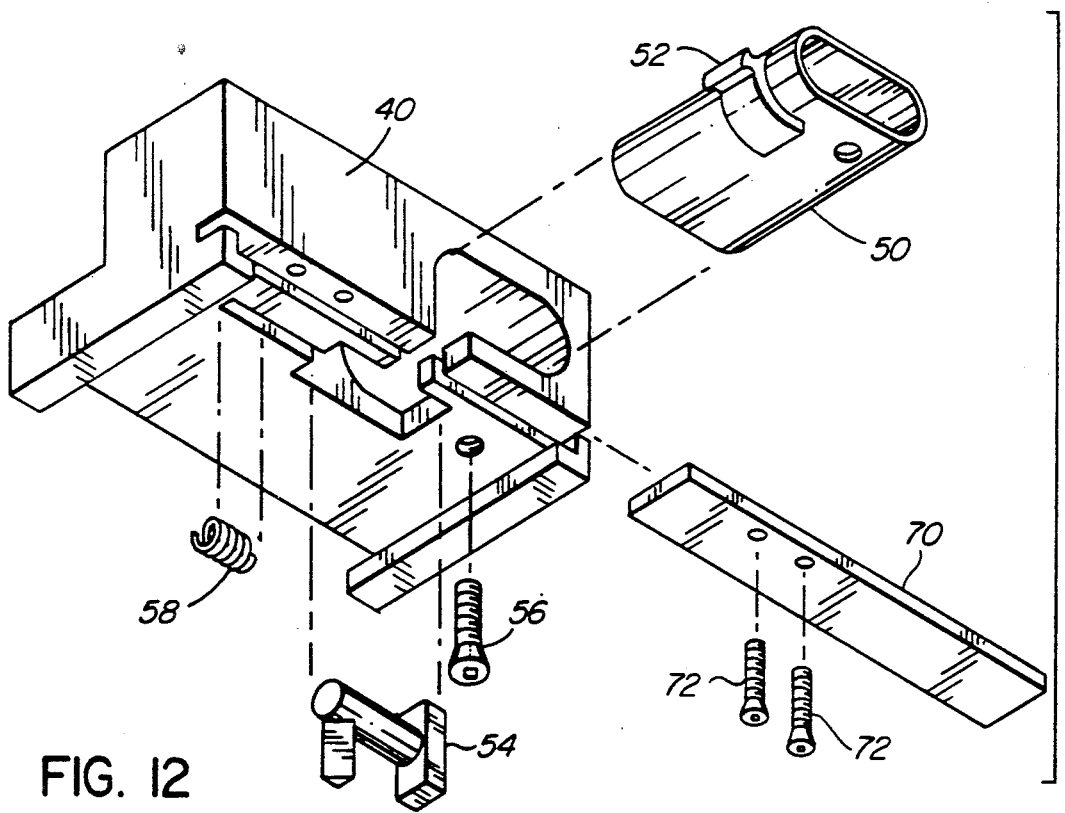
FIG. 12 is a perspective, exploded view of the elements of the second embodiment of the locking assembly.

For the second embodiment, for drives having an internal mechanism that moves a disk (or cassette) into a playing position, an example of the 3½" computer drive will be discussed. An actual diskette 60, seen in FIG. 7, is permanently fastened to an extension 62, and is used instead of the dedicated slide plate of the first embodiment. The diskette/plate 60 is inserted into drive 15, and in FIG. 9 can be seen in engaged position. As in the previous embodiment, locking assembly 40, FIG. 10, is now placed over the protruding part of diskette/plate 60. Key 44 is turned in the lock and removed, and the drive is locked in the engaged position, as seen in FIG. 11. This is accomplished by jamb plate 70, seen on FIG. 12, which prevents the drive's internal mechanism from returning the diskette/plate to the unengaged position. The plate 70 is held in position by screws 72. Otherwise the components of the locking assembly are identical to the previous embodiment.

The foregoing is by way of example only, and the scope of the invention should be limited only by the appended claims.

What I claim is:

1. An improved locking device for preventing unauthorized access to computer disk drives that have an external latch that has an open and a closed position, said closed position being designed to prevent entry or exit of standard disks appropriate to the drive; said device comprising:
   a) a slide plate to be inserted into the drive when the latch is in the open position; said slide plate being designed so that when the latch is in the closed position the slide plate is prevented from complete removal from the drive in substantially the same way as a standard disk appropriate to the drive is prevented;
   b) flanges on the edge of the slide plate opposite to the edge that is inserted into the drive, the spaces between flanges being designed to allow the latch to move into the closed position when the slide plate is at its maximum insertion, and being also designed so that when the slide plate is thereafter moved out of the drive an appropriate amount certain flanges block the movement of the latch such that it cannot return to the open position; and
   c) a means of locking the slide plate into said position in which flanges block the movement of the latch.

2. The locking device of claim 1, in which said means of locking is comprised of:
   a) a locking assembly placed over one or more of the flanges extending from the slide plate external to the drive when the slide plate is in the position blocking the movement of the latch; said locking assembly having a face abutting against the external face of the drive unit;
   b) means of engaging the locking assembly with one or more flanges, such that in the engaged position the slide plate can no longer be moved into the drive because the locking assembly abuts against the drive face; such engaged position having the effect that the latch is held in the closed position and the slide plate cannot be removed; and
   c) means of locking and unlocking the engagement of the locking assembly with the slide plate.

3. A device as in claim 1, in which said slide plate is as wide as an actual disk appropriate to the drive, and of thickness and depth less than or equal to the thickness and depth of an actual disk appropriate to the drive.

4. A device as in claim 1, in which said slide plate is of steel or similar strong material.

5. A device as in claim 2, in which the part of the locking assembly that engages the slide plate is of steel or similar strong material, and in which the slide plate is of steel or similar strong material.

* * * * *